(12) United States Patent
Unger et al.

(10) Patent No.: US 7,105,828 B2
(45) Date of Patent: Sep. 12, 2006

(54) HYBRID X-RAY DETECTOR

(75) Inventors: Christopher D. Unger, Brookfield, WI (US); Brian David Yanoff, Schenectady, NY (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 278 days.

(21) Appl. No.: 10/708,127

(22) Filed: Feb. 10, 2004

(65) Prior Publication Data

US 2005/0173641 A1    Aug. 11, 2005

(51) Int. Cl.
*G01T 1/24* (2006.01)

(52) U.S. Cl. .......................... 250/370.09; 250/370.06; 250/370.11

(58) Field of Classification Search ........... 250/370.06, 250/370.09, 370.11
See application file for complete search history.

(56) References Cited

U.S. PATENT DOCUMENTS

| | | | | |
|---|---|---|---|---|
| 3,742,215 A * | 6/1973 | Meuleman | ............. | 250/370.14 |
| 5,340,988 A | 8/1994 | Kingsley et al. | ....... | 250/370.09 |
| 5,751,783 A * | 5/1998 | Granfors et al. | ............ | 378/108 |
| 5,920,070 A | 7/1999 | Petrick et al. | ......... | 250/370.09 |
| 6,057,552 A * | 5/2000 | Stettner et al. | ........ | 250/370.09 |
| 6,393,098 B1 | 5/2002 | Albagli | ...................... | 378/98.2 |
| 6,408,050 B1 | 6/2002 | Han et al. | .................. | 378/98.9 |
| 2002/0027201 A1 * | 3/2002 | Agano | ................... | 250/370.11 |
| 2003/0189175 A1 | 10/2003 | Lee et al. | .............. | 250/370.08 |

* cited by examiner

*Primary Examiner*—Constantine Hannaher
(74) *Attorney, Agent, or Firm*—Cantor Colburn LLP

(57) ABSTRACT

A hybrid x-ray detector includes: a first detector that is adapted to receive x-rays, the first detector absorbs a first portion of the x-rays and allows a second portion of the x-rays to pass through the first detector; and a second detector that is adapted to receive the second portion of the x-rays. A radiation imaging system includes: an x-ray source that produces x-rays; and an image detector assembly that is adapted to receive the x-rays, the image detector assembly having a hybrid x-ray detector that includes: a first detector that is adapted to receive the x-rays, the first detector absorbs a first portion of the x-rays and allows a second portion of the x-rays to pass through the first detector; a second detector that is adapted to receive the second portion of the x-rays; and an x-ray source. A method of operating a hybrid x-ray detector, the method includes: receiving x-rays at a first detector; absorbing a first portion of the x-rays; passing a second portion of the x-rays through the first detector; and receiving the second portion of the x-rays at a second detector.

26 Claims, 4 Drawing Sheets

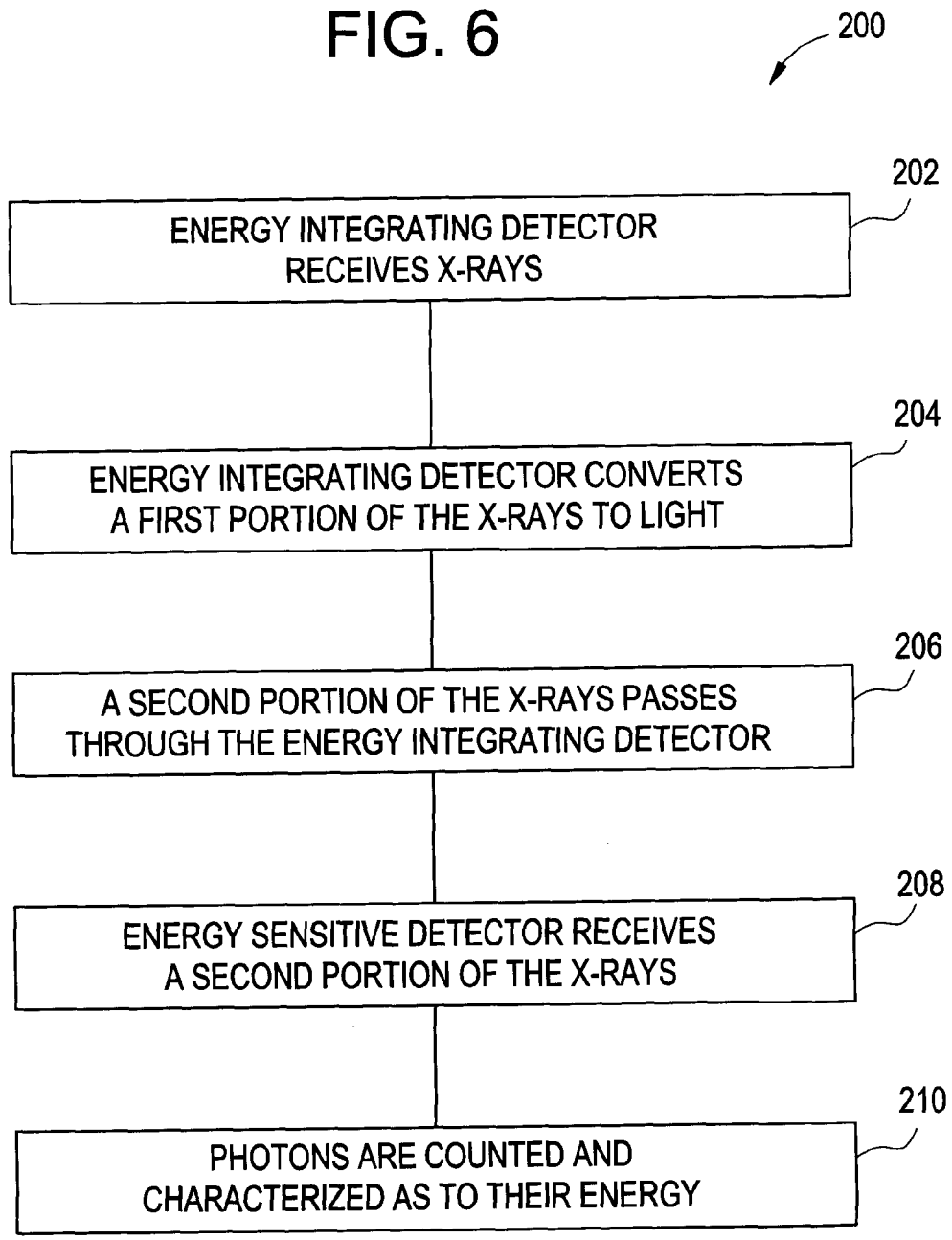

HYBRID X-RAY DETECTOR

BACKGROUND OF INVENTION

This invention relates generally to a system and method for differentiating material characteristics using an imaging system and more particularly to a system and method for differentiating material characteristics using a hybrid x-ray detector.

Energy discrimination adds significantly to the capabilities of an x-ray imaging detector. Energy discrimination improves signal to noise and potentially allows different materials to be distinguished. Current energy discrimination applications are limited to radiography (RAD) (digital radiography and computed radiography), mammography, and some dual energy computed tomography products. One strategy is to separate two detectors with a thin plate of metal, which preferentially absorbs low energy x-rays. Low energy x-rays then provide a relatively larger signal to the first detector and higher energy x-rays provide a relatively larger signal in the second detector. Another approach is to have two separate x-ray exposures and using different x-ray spectra for each. These approaches have in common that multiple images are acquired sequentially, and combined to produce one or more processed images representing the additional energy information. However, this approach only works well for single shot exposures, such as in RAD and mammographs.

For cardiac imaging, it is desirable to image small objects, such as guide wires and catheters, which are moving in real time, and to do so in thick patients, for which image quality is a major challenge. For this type of imaging, both high spatial resolution and sensitive material discrimination are desirable. Catheters are becoming smaller and harder to visualize in the rapidly moving heart. Thus, sequential imaging approaches to energy discrimination are not suitable for this application.

It is also noted that there also exist direct conversion detectors, such as thin film direct conversion detectors and single crystal direct conversion detectors. Thin film direct conversion detectors typically consist of polycrystalline materials, which are not capable of energy discrimination. Single crystal direct conversion detectors are more expensive to produce and are only available in small sizes. They typically have poor performance at the high x-ray flux rates required, and the small size requires tiling to produce large areas, which can result in gaps between tiles. The gaps cause data to be absent from the image, and can result in a misdiagnosis if critical anatomy is not correctly imaged.

SUMMARY OF INVENTION

The above discussed and other drawbacks and deficiencies are overcome or alleviated by a hybrid x-ray detector that includes: a first detector that is adapted to receive x-rays, the first detector absorbs a first portion of the x-rays and allows a second portion of the x-rays to pass through the first detector; and a second detector that is adapted to receive the second portion of the x-rays. A radiation imaging system includes: an x-ray source that produces x-rays; and an image detector assembly that is adapted to receive the x-rays, the image detector assembly having a hybrid x-ray detector that includes: a first detector that is adapted to receive the x-rays, the first detector absorbs a first portion of the x-rays and allows a second portion of the x-rays to pass through the first detector; a second detector that is adapted to receive the second portion of the x-rays. A method of operating a hybrid x-ray detector, the method includes: receiving x-rays at a first detector; absorbing a first portion of the x-rays; passing a second portion of the x-rays through the first detector; and receiving the second portion of the x-rays at a second detector.

BRIEF DESCRIPTION OF DRAWINGS

Referring to the exemplary drawings wherein like elements are numbered alike in the several Figures:

FIG. 6 is an exemplary method of operating the hybrid x-ray detector.

DETAILED DESCRIPTION

Figure 1:
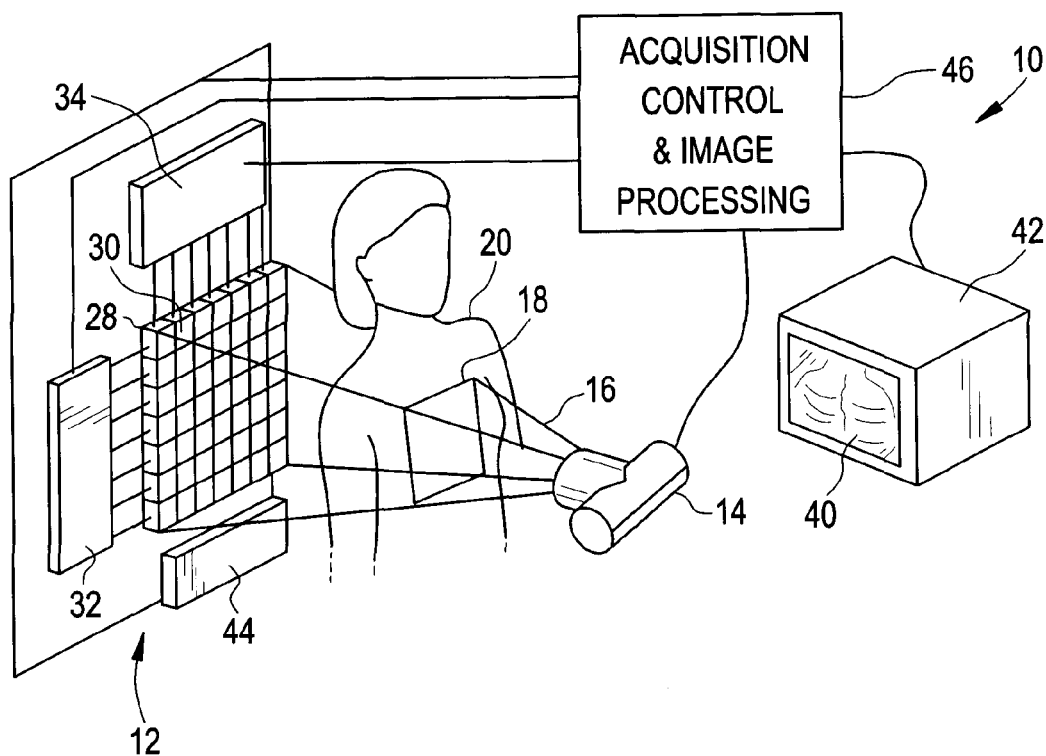
FIG. 1 is a perspective view of an x-ray system, represented schematically.

Referring to FIG. 1, an x-ray system 10, which incorporates a hybrid x-ray detector 12, has an x-ray source 14 that provides an x-ray beam 16 passing through an area 18 of a patient 20. The x-ray beam 16 is attenuated along its many rays by the internal structure of the patient 20 to then be received by the detector 12, which extends generally over an area in a plane perpendicular to the central ray of the x-ray beam 16.

Figure 2:
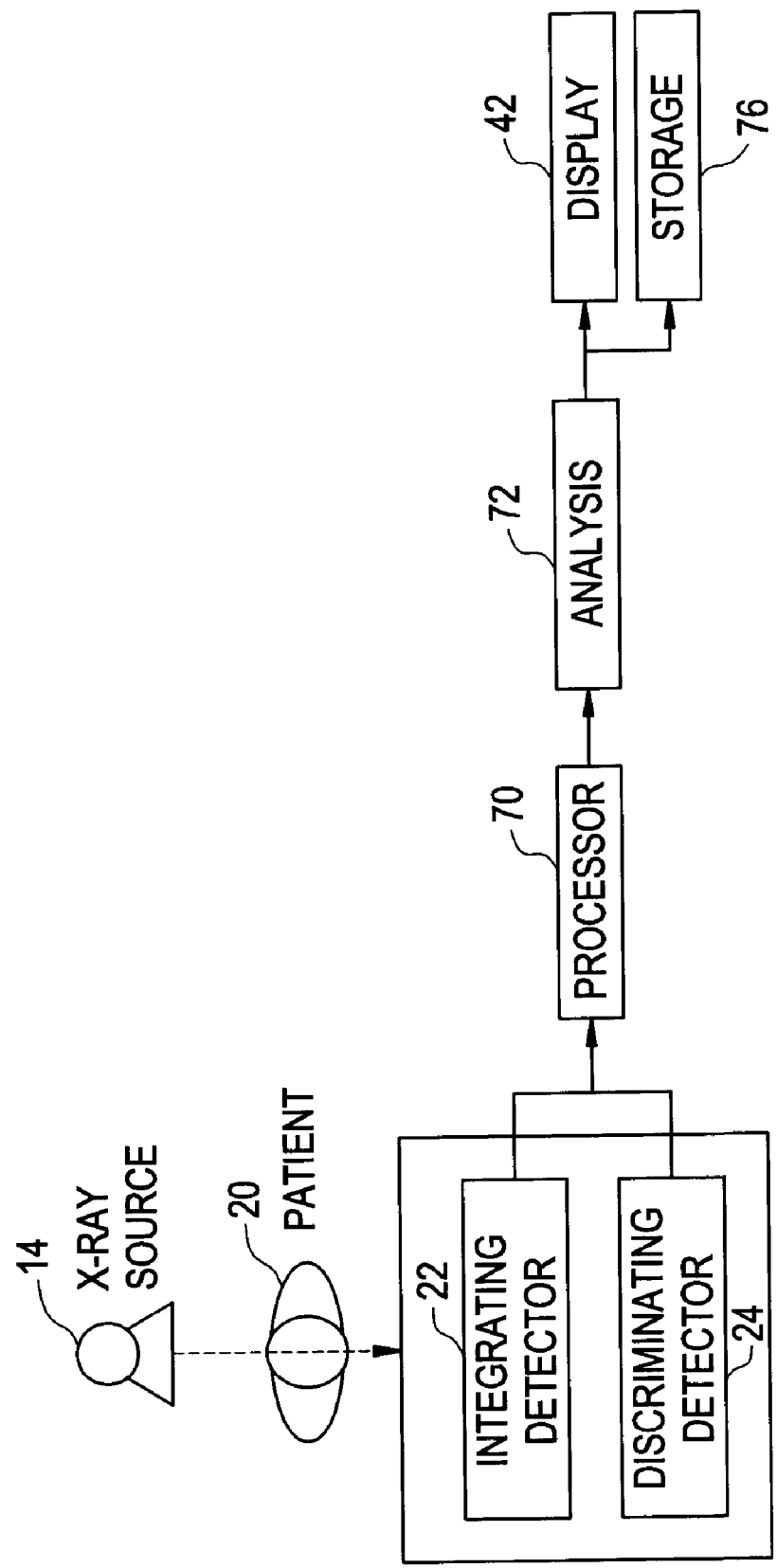
FIG. 2 is a block diagram of the x-ray system of FIG. 1.

Hybrid x-ray detector 12 includes an energy integrating detector 22 and an energy discriminating detector 24 (shown in FIG. 2). Energy integrating detector 22 adds all of the signals that land on each pixel and accumulates the signal in a storage device 26. Energy integrating detector 22 then reads out the sum of the energies that have landed on the pixel during the exposure to x-rays. A characteristic of the energy integrating detector 22 is that it provides a high resolution image giving the principal view of the anatomical data. Energy integrating detector 22 may be any type of detector that detects x-rays in the manner described above.

In an exemplary embodiment, energy integrating detector 22 is a scintillator detector coupled to light sensitive element, such as an array of photodiodes 28. The array 28 is divided into a plurality of individual cells 30 arranged rectilinearly in columns and rows. As will be understood to those of ordinary skill in the art, the orientation of the columns and rows is arbitrary, however, for clarity of description it will be assumed that the rows extend horizontally and columns extend vertically.

During operation the rows of cells 30 are scanned one at a time by scanning circuit 32 so that exposure data from each cell 30 may be read by read-out circuit 34. Each cell 30 independently measures the intensity of radiation received at its surface and thus the exposure data read-out provides one pixel of information in an image 40 to be displayed on a display 42, such as a monitor, normally viewed by the user.

Energy integrating detector 22 also includes a bias circuit 44 that controls a bias voltage to the cells 30. Each of the bias circuit 44, scanning circuit 32, and read-out circuit 34, communicates with an acquisition control and image processing circuit 46, which controls operation of circuits 44, 32, and 34 by means of an electronic processor. The acquisition control and image processing circuit 46 also controls the x-ray source 14, turning it on and off and controlling the current and thus the fluence of x-rays in beam 16 and/or the voltage and hence the energy of the x-rays in beam 16.

Referring to FIG. 2, energy discriminating detector 24 distinguishes the energy spectrum of the incident radiation. The discrimination of energy may occur in any manner known in the art. For instance, each photon may be analyzed separately so that the energy of each photon is distinguished. Also, when the absorption characteristics of the material that the x-rays initially pass through are known, then the overall spectrum of the photons may be analyzed. Energy discriminating detector 24 adds characterization information to the high resolution image. For instance, energy discriminating detector 24 provides the supplemental data, such as a highlighting the position or otherwise enhancing the visibility of the catheter, etc. Energy discriminating detector 24 may be any type of detector that discriminates energy.

In an exemplary embodiment, the energy discriminating detector 24 is a direct conversion detector, which is a tiled, single crystal direct conversion detector, like the one described in U.S. Pat. No. 6,408,050. The count rates on the direct conversion detector may be quite low, allowing counting of individual x-rays and/or energy discrimination. In another exemplary embodiment, energy discriminating detector 24 is a thin film detector that would have limited material decomposition functionality, since the energy discrimination would simply be the difference in spectrum between the initial and final photon absorption (beam hardening within the detector). The direct conversion detector adds characterization information to the high resolution image. Another example of energy discriminating detector 24 is a scintillator made of a crystalline scintillator material and one or more light-sensitive elements, such as a photodiode or the like. In each of the exemplary embodiments, energy discriminating detector 24 would be used to detect metal, calcium, or other material in the image.

Energy integrating detector 22 and energy discriminating detector 24 are coupled to an image processor 70, which receives the image data from both detectors 22 and 24. Once image processor 70 receives the image data, image processor 70 produces the image data into one or more processed images. In at least one of those images, clinically relevant information, such as a catheter or arterial calcification, is enhanced. An analysis 72 of those images then may occur. The analysis 72 takes the processed image or images and analyzes the characteristics of the images. The analysis 72 may include combining two or more processed images into processed and analyzed images. The initial processed images may be displayed at display 42 and/or may be stored at a storage device 76. In addition, the processed and analyzed images may be displayed at display 42 and/or may be stored at storage device 76. The processed and analyzed images may be used in any manner.

For instance, there are a number of uses for the processed and analyzed images. The first use for the processed and analyzed images is to produce a visual display for the user with improved visibility and/or conspicuity of the clinically relevant portion of the image and sends this image to display 42. One way of providing improved visibility is to provide different color for the clinically relevant portion of the image, i.e., the catheter being red, so that the clinically relevant portion of the image stands out and is enhanced.

The second use for the processed and analyzed images is to produce a score representing some clinically relevant risk factor. For example, a calcium score representing the total amount and distribution of calcium in the arteries, which bears some relation to the clinical risk of future heat attack.

The third use for the processed and analyzed images is to perform some Computer Aided Diagnosis or Computer Aided detection on the images. For example, automatically determining the location of arterial blockages, or highlighting to the user suspicious locations in the image.

Figure 3:
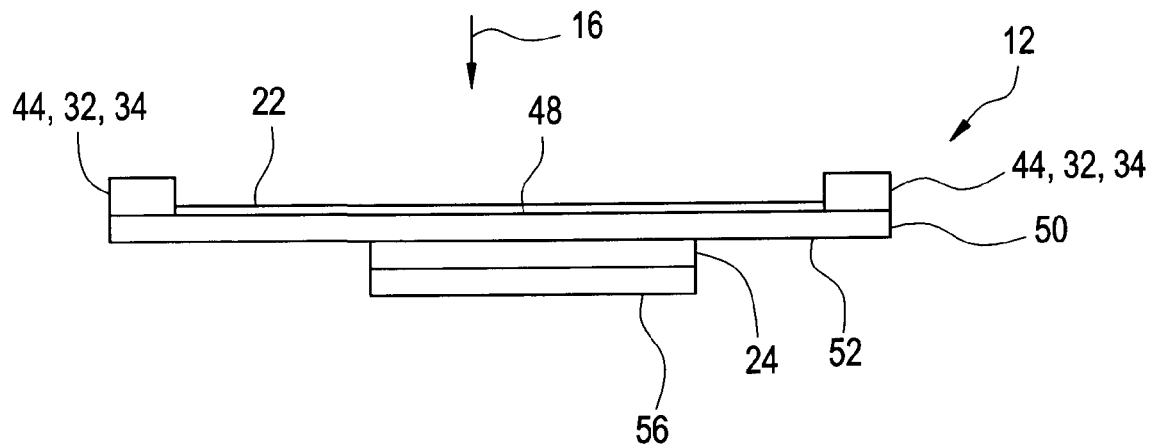
FIG. 3 is a cross section of an embodiment of a hybrid x-ray detector, represented schematically.

Referring to FIG. 3, hybrid x-ray detector 12 is shown in more detail. In an exemplary embodiment, hybrid x-ray detector 12 includes energy integrating detector 22 fabricated on a front side 48 of a substrate 50. Front side 48 receives x-ray beam 16. Energy discriminating detector 24 is located at a back side 52 of substrate 50 and may either be attached to back side 52 of substrate 50 or there may be a space between back side and energy discriminating detector 24; however, there is no attenuating plate or similar type of object between energy discriminating detector 24 and substrate 50. Energy discriminating detector 24 includes electronics 56, which may be energy sensitive electronics for measuring and counting photons. Electronics 56 counts photons or distinguishes the energy with some degree of energy resolution. Examples of such electronics include an Application Specific Integrated Circuit.

Substrate 50 is preferably a low x-ray attenuating substrate, such as a low barium glass substrate or polymer substrate. The low attenuation allows a sufficient number of x-rays to pass through energy integrating detector 22 and be received by the energy discriminating detector 24. For instance, low attenuation is approximately 80% to 90% transmission of the incident x-rays.

Energy discriminating detector 24 does not need to be very large, as it is used to supplement the primary x-ray image formed by energy integrating detector 22 and to highlight certain specific features, such as tracking the catheter tip. Thus, energy discriminating detector 24 is not required to image the entire field of view. For instance if a cardiac detector is 20 cm by 20 cm, energy discriminating detector 24 may be approximately 5 cm by 5 cm or 10 cm by 10 cm. However, the smaller energy discriminating detector 24 is merely to save cost and thus, energy discriminating detector 24 may also be the same size as energy integrating detector 22.

Figure 4:
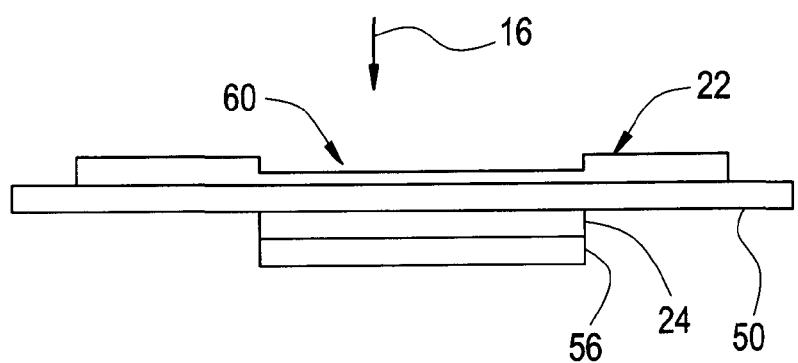
FIG. 4 is a cross section of an alternative embodiment of a hybrid x-ray detector, represented schematically.

Referring to FIG. 4, in another exemplary embodiment, energy integrating detector 22 includes a partially thinned area 60 in the region in front of energy discriminating detector 24. Both energy integrating detector 22 and energy discriminating detector 24 absorb x-rays 16. Substrate 50 also absorbs a small amount of x-rays 16, thereby possibly leaving an insufficient number of photons to form an image with the desired image quality. By having partially thinned area 60, energy integrating detector 22 will absorb about 75% of x-rays 16 and allows about 25% of x-rays 16 to pass through to energy discriminating detector 24. Then energy discriminating detector 24 absorbs about 90–95% of those x-rays that passed through energy integrating detector 22. Thus, the combined absorption for both energy integrating detector 22 and energy discriminating detector 24 is preferably approximately 97% to 99% of x-rays 16. In order to get good image quality, it is desirable to have at least 90% of x-rays 16 absorbed by both energy integrating detector 22 and energy discriminating detector 24.

The absorption of x-rays 16 at energy integrating detector 22 is reduced in the partially thinned region 60, providing an increased number of x-rays 16 for energy discriminating detector 24 to improve the image quality. Accordingly, improved photon statistics to energy discriminating detector 24 is obtained. In addition, the signal from energy discriminating detector 24 may be combined with the signal from energy integrating detector 22 to produce the conventional anatomical image, while the signal from the energy discriminating detector alone may be used to generate the target-specific image highlighting.

The amount of thinning in partially thinned area 60 depends on the image processing selected for the configuration. Partially thinned area 60 allows enough x-rays 16 to pass through to energy discriminating detector 24; however, too much thinning will also reduce the signal to noise ratio in the energy integrating detector 22 and potentially allow excessive flux to the energy discriminating detector 24.

Figure 5:
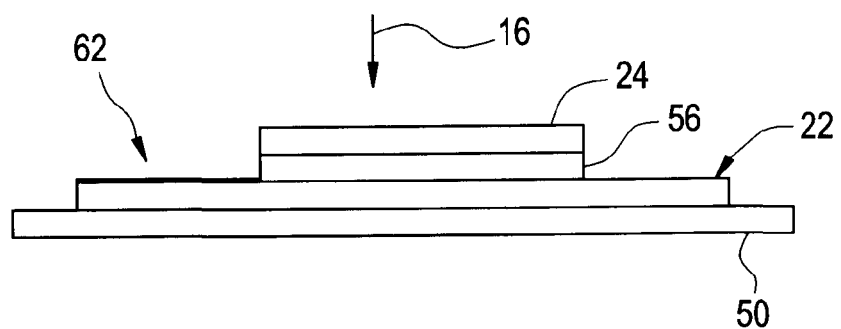
FIG. 5 is a cross section of an alternative embodiment of a hybrid x-ray detector, represented schematically.

Referring to FIG. 5, in another exemplary embodiment, energy discriminating detector 24 and electronics 56 are disposed on energy integrating detector 22, which is disposed on front side 48 of substrate 50. Leads 62 for electronics 56 may cross energy integrating detector 22. Energy discriminating detector 24 may or may not be coupled to energy integrating detector 22 and a space may also exist between energy discriminating detector 24 and energy integrating detector 22.

In this embodiment, energy discriminating detector 24 receives x-rays 16 first and would not absorb a significant number of x-rays 16, thereby leaving a sufficient number of x-rays for energy integrating detector 22. As with the embodiment of FIG. 4, the image displayed to the user could be formed by the sum of the data from energy discriminating detector 24 and energy integrating detector 22. In addition, because of the attenuation of the primary x-rays 16 by the metalization and energy discrimination electronics 56, and the increased radiation damage on energy discrimination electronics 56, a radiation hard silicon process should be used in the fabrication of the energy discrimination electronics. Moreover, it is preferable in this embodiment not to have a partially thinned area for energy integrating detector 22 so that energy integrating detector 22 will absorb as much as possible of the x-rays 16. Because energy discriminating detector 24 receives x-rays 16 first, it is desirable to absorb as much of the remaining x-rays 16 at energy integrating detector 22 as possible.

In addition, as seen by the exemplary embodiments, the order of the energy integrating detector and the energy discriminating detector does not matter. Thus, energy integrating detector can receive the x-rays first or the energy discriminating detector may receive the x-rays first. The important feature is that the detector that receives the x-rays first absorbs only a portion of the x-rays so that the second portion of the x-rays pass through to second detector. In addition, the energy integrating detector 22 absorbs the bulk of the x-rays 16 and forms a high resolution primary anatomical (density) image. Energy discriminating detector 24 adds characterization information to the high resolution image.

Referring to FIG. 6, an exemplary method 200 of operating the x-ray hybrid x-ray detector is illustrated. At step 202, the energy integrating detector receives x-rays. At step 204, the energy integrating detector converts a first portion of the x-rays to light. The amount of x-rays that are converted to light is controlled by choosing the thickness of the energy integrating detector. For instance, the thinner the energy integrating detector, the more x-rays that will pass through the energy integrating detector and the thicker the energy integrating detector, the less x-rays that will pass through the energy integrating detector. At step 206, a second portion of the x-rays passes through the energy integrating detector. At step 208, the energy discriminating detector receives a second portion of the x-rays. In an exemplary embodiment, the energy discriminating detector receives a small number of x-rays. At step 210, the x-rays that strike the energy discriminating detector are individually counted and characterized as to their energy. This allows different materials to be characterized. In an exemplary method, the energy integrating detector provides the anatomical data and the energy discriminating detector provides the supplemental data, such as a highlighting the position or otherwise enhancing the visibility of the catheter, etc. In addition, the energy integrating detector provides a high resolution image and the energy discriminating detector adds characterization information to the high resolution image.

The advantages of the hybrid x-ray detector are the use of an energy integrating detector and an energy discriminating detector together. The energy integrating detector forms the primary image, and the energy discriminating detector highlights certain features. Energy discriminating detectors are typically unable to image at high count rates. Thus, the energy integrating detector detects about 90% to 95% of the photons and provides a high resolution image, while the energy discriminating detector receives a low number of photons and can then discriminate the photons and count them, thereby detecting supplementary features, such as a catheter. In addition, the energy discriminating detector may have gaps between the imaging regions of adjacent tiles, which may cause image data to be missing. By combining the energy integrating detector with the energy discriminating detector, there are no gaps because the energy integrating detector forms the primary image and the energy discriminating detector is used to highlight certain features. Thus, all of the desired information is captured in the image formed by the two detectors.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A hybrid x-ray detector for use in imaging an object, comprising:

a first detector that is adapted to receive x-rays, said first detector absorbs a first portion of said x-rays and allows a second portion of said x-rays to pass through said first detector; and a second detector that is adapted to receive said second portion of said x-rays; wherein one of said detectors is an energy integrating detector configured to provide a high resolution image giving a principal view of the exposed object in response to said x-rays, and the other of said detectors is an en discriminating detector configured to distinguish the energy spectrum of said x-rays incident thereon and to provide additional characterization information to said high resolution image in response to the same said x-rays; and wherein said first and second detectors are arranged to be used together in a one-shot exposure to said x-rays.

2. The detector of claim 1, wherein said first detector is said energy integrating detector and said second detector is said energy discriminating detector.

3. The detector of claim 2, wherein said first detector is one of a scintillator detector coupled to a light sensitive element and a direct conversion detector.

4. The detector of claim 2, wherein said second detector is one of a scintillator detector coupled to a light sensitive element and a direct conversion detector.

5. The detector of claim 2, wherein said second detector is smaller than said first detector.

6. The detector of claim 2, wherein said first detector is thinner in an area tat is not larger than said second detector.

7. The detector of claim 1, wherein said first detector is said energy discriminating detector and said second detector is said energy integrating detector.

8. The detector of claim 1, wherein said first detector is disposed adjacent to said second detector.

9. The detector of claim 1, wherein said first detector is fabricated on a substrate having a transmission of at least 80% of said first portion of said x-rays.

10. A radiation imaging system for use in imaging an object, comprising:
   an x-ray source that produces x-rays; and
   an image detector assembly that is adapted to receive said x-rays, said image detector assembly having a hybrid x-ray detector that includes;
   a first detector that is adapted to receive said x-rays, said first detector absorbs a first portion of said x-rays and allows a second portion of said x-rays to pass through said first detector; and
   a second detector that is adapted to receive said second portion of said x-rays; wherein one of said detectors is an energy integrating detector configured to provide a high resolution image giving a principal view of the exposed object in response to said x-rays, and the other of said detectors is an energy discriminating detector configured to distinguish the energy spectrum of said x-rays incident thereon and to provide additional characterization information to said high resolution image in response to the same said x-rays; and
   wherein said first and second detectors are arranged to be used together in a one-shot exposure to said x-rays.

11. The system of claim 10, further comprising a processor that receives data from said first detector and said second detector.

12. The system of claim 11, wherein said processor analyzes said data to produce at least one image.

13. The system of claim 12, further comprising an analysis of said at least one image to produce an analyzed image.

14. The system of claim 11, further comprising a display in communication with said processor.

15. The system of claim 10, wherein said first detector is said energy integrating detector and said second detector is said energy discriminating detector.

16. The detector of claim 15, wherein said first detector is one of a scintillator detector coupled to a light sensitive element and a direct conversion detector.

17. The detector of claim 15, wherein said second detector is one of a scintillator detector coupled to a light sensitive element and a direct conversion detector.

18. The system of claim 15, wherein said second detector is smaller than said first detector.

19. The system of claim 15, wherein said first detector is thinner in an area that is not larger than said second detector.

20. The system of claim 10, wherein said first detector is said energy discriminating detector and said second detector is said energy integrating detector.

21. A method of operating a hybrid x-ray detector for imaging an object, the method comprising;
   receiving x-rays at a first detector;
   absorbing a first portion of said x-rays;
   passing a second portion of said x-rays through said first detector;
   receiving said second portion of said x-ray at a second detector;
   producing in response to a signal from one of said detectors a high resolution image giving a principal view of the exposed object; and
   distinguishing in response to a signal from the other of said detectors the energy spectrum of said x-rays incident thereon, thereby providing additional characterization information to the high resolution image;
   wherein said producing in response to a signal from one of said detectors, and said distinguishing in response to a signal from the other of said detectors, are responsive to the same one-shot exposure to said x-rays.

22. The method of claim 21, further comprising producing an image.

23. The method of claim 22, further comprising analyzing said image.

24. The method of claim 23, further comprising producing an analyzed image.

25. The method of claim 24, further comprising displaying said analyzed image.

26. The meted of claim 22, further comprising displaying said image.

* * * * *